United States Patent
Van Zon et al.

(10) Patent No.: US 6,330,035 B1
(45) Date of Patent: Dec. 11, 2001

(54) TELEVISION SIGNAL RECEIVER

(75) Inventors: Cornelis C. A. M. Van Zon, Eindhoven (NL); Franciscus W. Sijstermans, Mountain View, CA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/793,745

(22) Filed: Feb. 26, 2001

Related U.S. Application Data

(63) Continuation of application No. 08/489,867, filed on Jun. 13, 1995, now Pat. No. 6,222,591.

(30) Foreign Application Priority Data

Jun. 23, 1994 (EP) .................................................. 94201797

(51) Int. Cl.[7] .................................................. H04N 5/44
(52) U.S. Cl. ........................ 348/553; 348/725; 348/552
(58) Field of Search .................................. 348/552, 553, 348/554, 555, 571, 520, 668, 669, 558, 557, 725, 726, 731, 732, 734; H04N 5/46, 5/52, 5/44

(56) References Cited

U.S. PATENT DOCUMENTS

| | | | |
|---|---|---|---|
| 4,743,968 | 5/1988 | Mogi et al. | 358/147 |
| 4,814,862 | 3/1989 | Travert | 358/31 |
| 4,885,546 * | 12/1989 | Araki | 329/341 |
| 5,181,113 | 1/1993 | Chang | 358/142 |
| 5,187,575 | 2/1993 | Lim | 358/142 |
| 5,285,264 | 2/1994 | Matsushita | 348/571 |
| 5,459,526 | 10/1995 | Yamada | 348/555 |
| 5,539,920 * | 7/1996 | Menand et al. | 348/461 |
| 5,555,197 * | 9/1996 | Ninomiya et al. | 348/571 |

FOREIGN PATENT DOCUMENTS

549442A2   3/1993   (EP) ................................. H04N/9/64

* cited by examiner

Primary Examiner—Michael Lee
(74) Attorney, Agent, or Firm—Edward W. Goodman

(57) ABSTRACT

A television signal receiver (television apparatus, video recorder, CDI player) executes a plurality of processing operations to be executed (sync separation, subcarrier regeneration, color decoding, teletext) with a central processing unit (4). Each processing operation is stored in the form of a control program in a memory (10). The processing operations to be actually executed are selected and time-sequentially executed by the processing unit. The control programs to be executed are selected in dependence upon operating signals (TXT, PIP) or signal recognition (PAL, NTSC). Qualitatively different versions of some control programs are stored and the version which can be executed at the available processing capacity is selected.

10 Claims, 3 Drawing Sheets

TELEVISION SIGNAL RECEIVER

CROSS-REFERENCE TO RELATED APPLICATIONS

This is a continuation of U.S. patent application Ser. No. 08/489,867, filed Jun. 13, 1995, now U.S. Pat. No. 6,222,591.

BACKGROUND OF THE INVENTION

1. Field of the Invention

The invention relates to a television signal receiver comprising a plurality of processing means for executing respective processing operations on a received television signal. A receiver of this type is, for example, a television apparatus, a video recorder or a CDI player.

2. Description of the Related Art

Receivers of the type described in the opening paragraph are generally known. The signal received from a tuner, tape or disc is subjected, in the receiver, to a plurality of processing operations each having a predetermined function. For example, a television apparatus comprises, inter alia, the following processing means:

- a sync separator which separates synchronizing signals from the video signal for deriving horizontal and vertical deflection signals for a display screen;
- a color decoder which splits the television signal into chrominance signals and a luminance signal for generating three elementary color signals R, G and B;
- a teletext decoder which regenerates a data signal in the vertical retrace period of the television signal, stores the data of a selected page, and reads, decodes and displays this data at a desired picture frequency;
- an audio decoder for decoding the audio signal; and
- an operating circuit.

In the known television receivers, said processing means are realized in the form of specially developed integrated circuits (ICs). Each IC has a given processing power for executing the processing operation, this processing power being determined, to a considerable extent, by previously fixed requirements of picture quality, sound quality and convenience of operation. The processing power of an IC becomes manifest in the quantity of chip surface area. The plurality of ICs and peripheral components in the receiver represents the overall processing power of the receiver. This overall processing power is also dependent on the extent to which the receiver has features such as teletext, picture-in-picture, stereo sound and multi-standard reception.

The overall processing power of the known television receiver is determined by the sum of the processing power of all processing means. The processing power is fixed as soon as the ICs have been chosen and interconnected and is independent of the fact whether a given processing operation is executed or not executed. The functionality of the known receiver is also fixed invariably.

SUMMARY OF THE INVENTION

It is an object of the invention to provide a television signal receiver which is constructed in an alternative manner.

The receiver according to the invention is characterized in that each processing operation is laid down in a control program stored in a memory, and in that the plurality of processing means is constituted by a processing unit which consecutively executes selected control programs in synchronism with the television signal.

Such a receiver is very flexible. This is understood to mean that functions can be modified or added by modification or addition of an appropriate control program. Due to this flexibility, new apparatuses can be rapidly developed and marketed. By modifying or adding control programs, it is also possible to upgrade apparatuses which have already been manufactured. If desired, upgrading may even be carried out by the user, for example, by means of a smartcard or by downloading data from a transmitter. A user may also give his/her television apparatus a personal touch. He/she may choose a sub-set of the stored control programs as long as the processing power of the processing unit is not exceeded.

An embodiment of the receiver is characterized in that the processing unit is adapted to select the control programs to be executed in dependence upon operating signals which are received from an operating unit. A further embodiment of the receiver is characterized in that the processing unit is adapted to select the control programs to be executed in dependence upon output signals of a processing operation. These embodiments are based on the recognition that a television receiver need not execute all processing operations simultaneously. Some processing operations are only necessary in user-selected operating modes (for example, teletext or picture-in-picture). Other processing operations are only necessary if a television signal in accordance with a given standard (PAL, SECAM, NTSC) is received. The processing power of the processing unit is thus adaptively used in said embodiments for the processing operations to be actually executed. No processing power of the processing unit is necessary for a processing operation which is not executed. The overall processing power may thus be smaller than that of the known receivers in which the processing power of all processing operations is fully and continuously present.

A very favorable embodiment of the receiver is characterized in that at least one processing operation is laid down in at least two control programs of different complexity, the processing unit being adapted to select the most complex control program which can be executed. For example, in a mixed TV/TXT mode, in which both color decoding and teletext decoding are operational, a less sophisticated teletext control program may be executed than in a teletext-only mode. After a change of channels, a qualitatively better control program can also be executed for sync processing so that the receiver captures a new station more rapidly at the expense of, for example, a (temporarily) lower picture quality.

DESCRIPTION OF THE PREFERRED EMBODIMENTS

Figure 1:
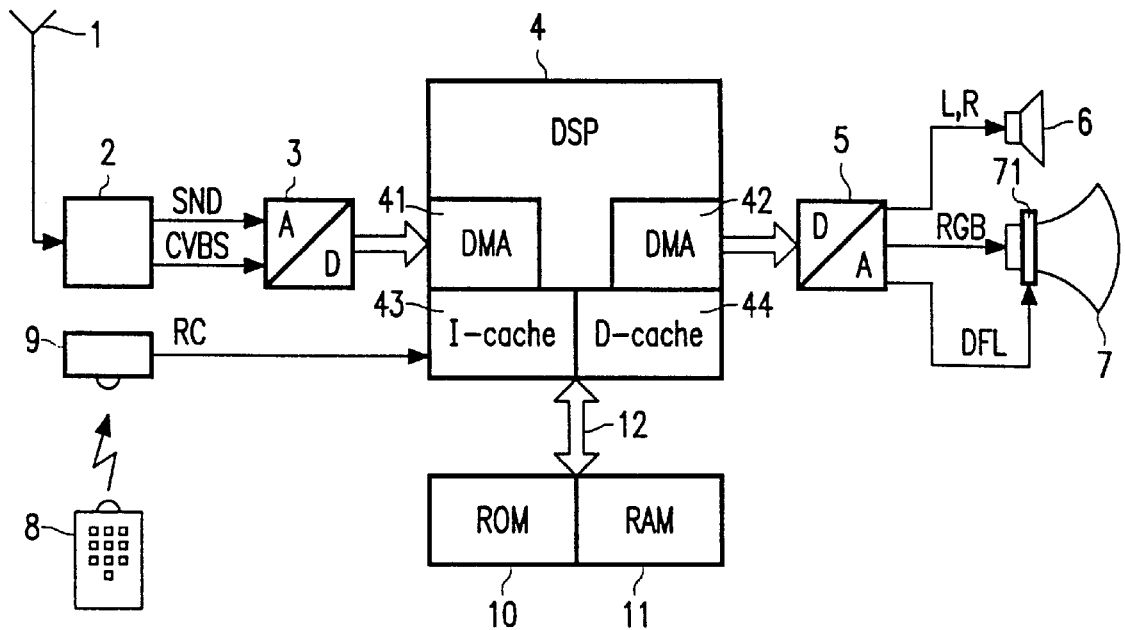
FIG. 1 shows, diagrammatically, the structure of a television receiver according to the invention.

FIG. 1 shows, diagrammatically, the structure of a television receiver according to the invention. The receiver is connected to an antenna 1 and comprises a front-end 2, A/D converters 3, a digital signal processor 4, D/A converters 5, one or more loudspeakers 6, a display screen 7, a remote-control transmitter 8 and a remote-control receiver 9. The signal processor 4 receives an intermediate frequency sound signal SND and a composite video signal CVBS from the front-end 2. These signals are digitized by means of the A/D converters 3. Moreover, the signal processor receives remote-control signals RC from the remote-control receiver 9. Via the D/A converters 5, the processor applies audio signals L and R to the loudspeakers 6, elementary color signals RGB to the display screen 7, and deflection signals DFL to a deflection unit 71 secured to the display screen. Other signals which are (or may be) present in practice are not shown for the sake of clarity. Extra inputs and outputs, a second front-end for PIP, etc., are examples.

The digital signal processor 4 is preferably a high-performance processor having a RISC architecture (Reduced Instruction Set Computer), for example, the type PA1700LC of Hewlett Packard or the type TMS320C90 of Texas Instruments. The processor can execute several hundred million operations per second on 16-bit or 32-bit data words and is therefore eminently suitable for the real-time processing of video signals. The processor is coupled, via a communication bus 12, to an instruction memory 10 of the ROM type and a data memory 11 of the RAM type. Samples of input signals, output signals and possible auxiliary signals are stored in the data memory 11. The storage of input signals of front-end 2 and reading of output signals for loudspeakers 6 and display screen 7 is effected by means of Direct Memory Access (DMA) circuits 41 and 42, respectively, which are accommodated in signal processor 4. To minimize the load of the communication bus 12, the signal processor has cache memories. A first cache memory 43 is provided for temporarily buffering instructions from instruction memory 10, a second cache memory 44 is provided for temporarily buffering data words from/to data memory 11.

Figure 2:
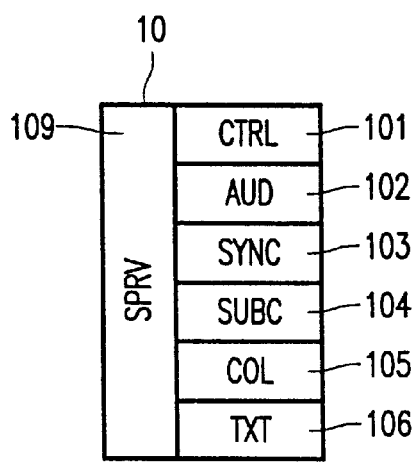
FIG. 2 shows a possible division of an instruction memory shown in FIG. 1.

FIG. 2 shows a possible layout of the instruction memory 10. It comprises a plurality of control programs. More particularly, it comprises a control program 101 (CTRL) for processing remote control signals RC, a control program 102 (AUD) for demodulating the IF sound signal SND, a control program 103 (SYNC) for separating synchronizing signals from the video signal CVBS, a control program 104 (SUBC) for regenerating the chrominance subcarrier, a control program 105 (COL) for decoding the color signals from the video signal CVBS, and a control program 106 (TXT) for teletext decoding and display. Each control program comprises instructions for processing data words in data memory 11 and/or data cache 44 by signal processor 4 (see FIG. 1). Each time, a time-limited portion of signals is processed. This may be one sample of a signal to be processed (for example, one sample of the video signal) or a plurality of samples (for example, a picture line or a frame). It will hereinafter be assumed that the signals are processed line by line. The instruction memory 10 shown in FIG. 2 further comprises a "supervisor" program 109 (SPRV) which determines which control program is executed by the signal processor and in which order these programs are executed. To this end, the supervisor successively loads, during a picture line, the control programs to be executed in the instruction cache of the signal processor.

Figure 3:
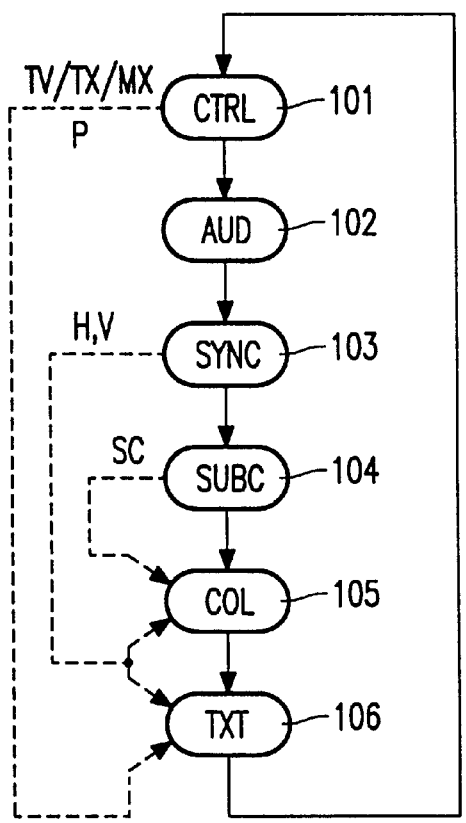
FIGS. 3–6 show embodiments of a flowchart of a program which is executed by a signal processor shown in FIG. 1.

In a first embodiment of the receiver, the supervisor loads and executes all control programs present in memory 10 successively. FIG. 3 shows a flowchart of the program which is accordingly executed by the signal processor. As has been attempted to show in the Figure, the supervisor first loads the operating control program 101. This control program interprets the remote control signals and generates, inter alia, an auxiliary signal TV/TX/MX indicating whether the receiver is in an operating mode "TV-only", "TXT-only" or "mixed TV/TXT". The control program CTRL also generates an auxiliary signal P which defines the page number of a desired teletext page. Said auxiliary signals are stored in data cache 44 (see FIG. 1) so that they are accessible for other control programs. They are shown as broken lines in FIG. 3 so as to distinguish them from the solid lines indicating the order of processing operations.

Subsequently, the supervisor loads the control program 102 (AUD) in the instruction cache of the signal processor. Samples of the IF sound signal are decoded by this control program and samples of the audio signals L and R to be reproduced are computed.

In a corresponding manner, the control programs 103 (SYNC) for sync regeneration and 104 (SUBC) for chrominance subcarrier regeneration are subsequently loaded and executed. The control program SYNC generates the deflection signals DFL for the display screen, as well as auxiliary synchronizing signals for use by other control programs. The control program SUBC generates a regenerated subcarrier SC for use by other control programs. The auxiliary signals are again shown as broken lines.

Subsequently, the supervisor loads the control program 105 (COL). This control program processes all video samples of a picture line so as to obtain a displayable RGB picture signal. As is shown in FIG. 3, the control program COL uses the auxiliary signals H, V and the subcarrier SC.

Subsequently, the control program 106 (TXT) is executed. This control program decodes a teletext signal during the vertical retrace and acquires a desired page. To this end, the control program uses the auxiliary synchronizing signals H, V and the page number P. The acquired page is translated into RGB pixels which are stored in data memory 11 (see FIG. 1) for later display. Dependent on the auxiliary signal TV/TX/MX, the RGB picture signal generated by the control program COL is hereby completely overwritten (TXT only), partly overwritten (mixed TV/TXT) or not overwritten (TV only).

The control programs AUD, SYNC, COL and TXT, which generate an output signal intended for reproduction and display (audio signals L and R, deflection signals DFL, RGB picture signal, teletext pixels), store the obtained samples via data cache 44 in data memory 11. The samples are subsequently applied in an autonomic way to the loudspeakers 6 and the display screen 7 by means of the DMA circuit 42.

The processing operations described are performed each picture line so that real-time display and reproduction of picture and sound takes place. Loading each control program in the instruction cache of the signal processor and the subsequent execution of the operation always takes a given execution time. This time is dependent on the computing capacity of the signal processor and the complexity of the control program. In the embodiment of FIG. 3, it is assumed that all control programs can be executed within the available line period of 64 usec. Computations and practical experiments have proven that the control programs for operation, synchronization and subcarrier regeneration are relatively simple and require a short execution time. The control programs for audio processing, color decoding and teletext are, however, rather large. It should also be noted that, in practice, additional control programs are desired for functions such as processing external signals, picture-in-picture display, multi-standard reception, picture enhancements such as noise reduction, and the like.

Figure 4:
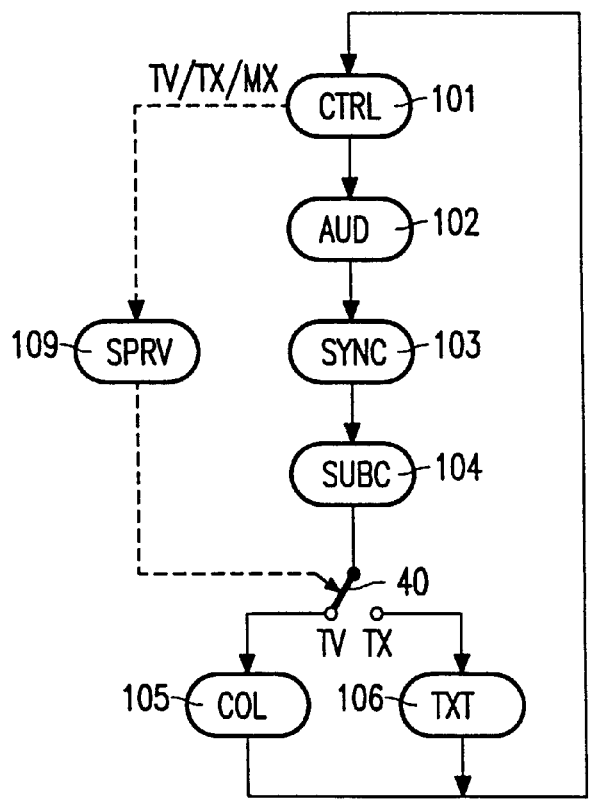

Embodiments of the receiver will hereinafter be elucidated, in which the signal processor cannot execute all control programs within the available time. FIG. 4 shows the flowchart of an embodiment in which the supervisor is adapted to select the control programs to be executed in dependence on operating signals. Entirely analogous to the flowchart of FIG. 3, the control programs CTRL, AUD, SYNC and SUBC are consecutively loaded and executed. It is assumed that these operations take 14 μsec so that the remaining line period is 50 μsec. This period is insufficient for executing both the control program COL (40 μsec) and the control program TXT (20 μsec). The supervisor SPRV now receives the auxiliary signal TV/TX/MX which is generated by the user and is applied to the supervisor by the control program CTRL. With reference to this auxiliary signal, the supervisor decides whether the control program COL (in the operating mode "TV only") or the control program TXT (in the operating mode "TXT only") is loaded. This is symbolically indicated in FIG. 4 by means of a switch 40. The operating mode "mixed TV/TXT" is not possible in this embodiment.

Figure 5:
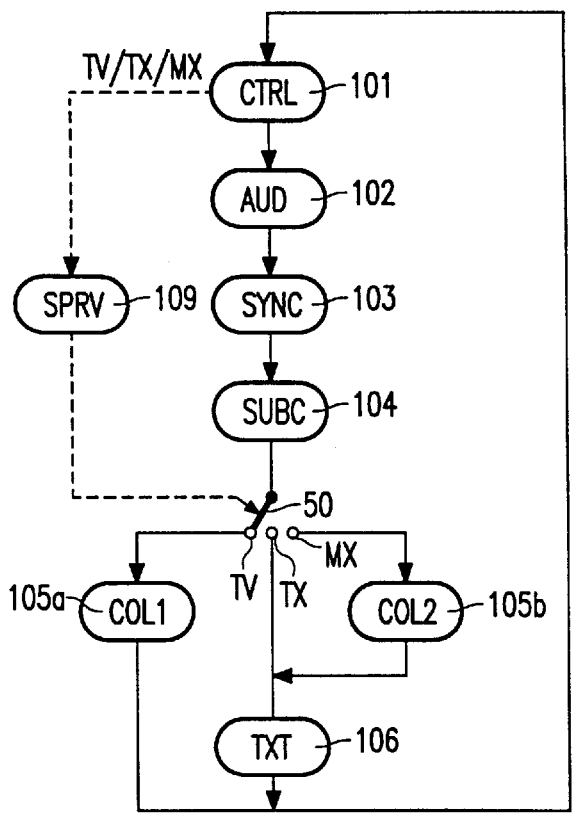

FIG. 5 shows the flowchart of an embodiment in which also the "mixed TV/TXT" mode is implemented. In this embodiment the instruction memory comprises two different versions of the control program COL for color decoding: a complex version 105a (COL1) having a high picture quality and an execution period of 40 μsec and a simpler, less qualitative version 105b (COL2) having an execution period of 25 μsec. In practice, such a simpler version is obtained by using, for example, shorter filter lengths in the color decoding algorithm. As is symbolically shown by means of switch 50 in FIG. 5, the supervisor loads the complex control program COL1 in the operating mode "TV only", the control program TXT in the operating mode "TXT only" and, consecutively, the simpler control program COL2 and the control program TXT in the operating mode "mixed TV/TXT". The execution period of COL2 and TXT combined is 45 μsec and can be executed within the rest of the line period.

Many variations of the embodiment shown in FIG. 5 are possible. A useful alternative is to implement a color decoder having a good quality and two different versions of the teletext decoder, for example, a simple single-page low-resolution decoder in the mixed mode and an advanced multipage high-resolution decoder in the "TXT only" mode.

Figure 6:
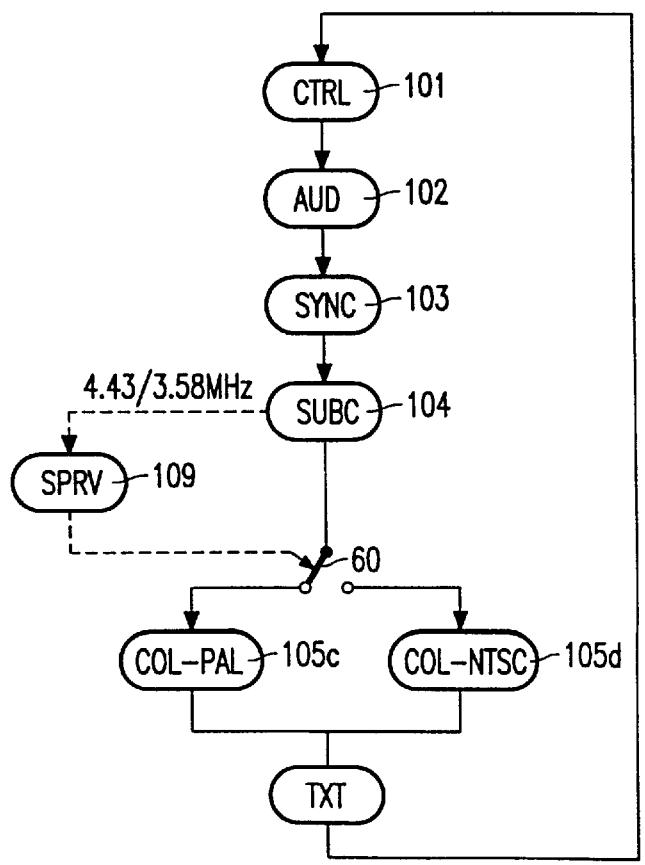

FIG. 6 shows the flowchart of an embodiment in which the supervisor selects the control programs to be executed in dependence upon output signals of other control programs. In this embodiment, the instruction memory also comprises two different versions of the control program COL for color decoding, a version 105c (COL-PAL) for PAL signals and a version 105d (COL-NTSC) for NTSC signals. Again analogously to the foregoing, the control programs CTRL, AUD, SYNC and SUBC are consecutively loaded and executed. In this embodiment, the control program SUBC for regenerating the chrominance subcarrier detects whether the subcarrier frequency is 4.43 MHz or 3.58 MHz and passes on this information to the supervisor. Dependent thereon, the supervisor now selects the PAL or NTSC version of the color decoder by means of the switch 60 which is shown symbolically.

Another example of an embodiment in which the supervisor selects the control programs to be executed in dependence upon output signals of other control programs, is obtained if one of the control programs is a measuring program for measuring the quality of the received signal, for example, the quantity of noise. Dependent thereon, a control program for suppressing noise can be selected.

If desired, the embodiments described hereinbefore may be combined. For example, by combining FIGS. 5 and 6, a multi-standard PAL/NTSC receiver is obtained which in the mixed TV/TXT mode either activates a less advanced form of color decoding or provides fewer teletext facilities.

It is further possible to load a more complicated version of a given control program as there is more execution time available for this program. The available time may even vary dynamically if the execution time of processing operations is variable. For example, the execution time of the control programs COL and TXT within the vertical field retrace period is shorter than outside this period because it is not necessary to generate a picture. During this retrace period a more advanced version of the control program SYNC can be loaded. It is also possible to temporarily use extra processing power for synchronization and less power for color decoding after a change of channels, so that the receiver rapidly displays a stable picture.

What is claimed is:

1. A television signal receiver comprising:
   an input for receiving digital television signals;
   a tuner for selecting one of said received digital television signals;
   a signal processing circuit coupled to said input for processing said selected digital television signal, and for forming a video signal, an audio signal and deflection signals from said selected digital television signal;
   a memory coupled to said signal processing circuit for storing control programs for controlling said signal processing circuit to perform respective processing operations on said selected television signal, said processing operations including synchronizing signal separation, color decoding, and audio decoding;
   means for controlling said signal processing circuit to consecutively execute selected ones of the control programs in synchronism with the digital television signal; and
   means for applying said audio signal to at least one loudspeaker, and for applying said video signal and said deflection signals to a display device.

2. The television signal receiver as claimed in claim 1, wherein the controlling means comprises a further control program contained in said memory.

3. The television signal receiver as claimed in claim 1, wherein said television signal receiver further comprises:
   a remote control transmitter for transmitting control signals for controlling said television signal receiver; and
   a remote control signal receiver for receiving said control signals and for applying said control signals to said signal processing circuit, wherein the controlling means selects the control programs to be executed by the signal processing circuit in dependence on said control signals.

4. The television signal receiver as claimed in claim 1, wherein said controlling means selects the control programs to be executed by the signal processing circuit in dependence on output signals of one of said processing operations.

5. The television signal receiver as claimed in claim 1, wherein said signal processing circuit has a predetermined amount of processing power, wherein for at least one of the processing operations, at least two of the control programs comprise different complexities of the at least one processing operation, and wherein said controlling means selects, in dependence on the predetermined amount of processing power, the most complex control program which can be executed along with the other selected control programs for the other processing operations.

6. The television signal receiver as claimed in claim 2, wherein said television signal receiver further comprises:

a remote control transmitter for transmitting control signals for controlling said television signal receiver; and a remote control signal receiver for receiving said control signals and for applying said control signals to said signal processing circuit, wherein the controlling means selects the control programs to be executed by the signal processing circuit in dependence on said control signals.

7. The television signal receiver as claimed in claim 2, wherein said controlling means selects the control programs to be executed by the signal processing circuit in dependence on output signals of one of said processing operations.

8. The television signal receiver as claimed in claim 2, wherein said signal processing circuit has a predetermined amount of processing power, wherein for at least one of the processing operations, at least two of the control programs comprise different complexities of the at least one processing operation, and wherein said controlling means selects, in dependence on the predetermined amount of processing power, the most complex control program which can be executed along with the other selected control programs for the other processing operations.

9. The television signal receiver as claimed in claim 3, wherein said controlling means selects the control programs to be executed by the signal processing circuit in dependence on output signals of one of said processing operations.

10. The television signal receiver as claimed in claim 3, wherein said signal processing circuit has a predetermined amount of processing power, wherein for at least one of the processing operations, at least two of the control programs comprise different complexities of the at least one processing operation, and wherein said controlling means selects, in dependence on the predetermined amount of processing power, the most complex control program which can be executed along with the other selected control programs for the other processing operations.

* * * * *